United States Patent
Abe

(10) Patent No.: US 6,715,068 B1
(45) Date of Patent: Mar. 30, 2004

(54) MULTI-MICROCOMPUTER SYSTEM

(75) Inventor: Kazunori Abe, Ohmiya (JP)

(73) Assignee: Fuji Photo Optical Co., Ltd., Saitama-ken (JP)

( * ) Notice: Subject to any disclaimer, the term of this patent is extended or adjusted under 35 U.S.C. 154(b) by 0 days.

(21) Appl. No.: 09/540,899

(22) Filed: Mar. 31, 2000

(30) Foreign Application Priority Data

Mar. 31, 1999 (JP) ............................................ 11-091498
Mar. 31, 1999 (JP) ............................................ 11-091499

(51) Int. Cl.[7] .......................... G06F 9/24; G06F 15/177
(52) U.S. Cl. ................................ 713/1; 713/2; 709/200
(58) Field of Search ........................ 713/1, 2; 370/305; 709/200

(56) References Cited

U.S. PATENT DOCUMENTS

| | | | |
|---|---|---|---|
| 5,212,792 A | * 5/1993 | Gerety et al. | 717/100 |
| 5,684,952 A | * 11/1997 | Stein | 709/221 |
| 5,694,360 A | * 12/1997 | Iizuka et al. | 365/185.33 |
| 5,737,585 A | 4/1998 | Kaneshima | 395/500 |
| 5,760,707 A | * 6/1998 | Katagiri | 340/870.11 |
| 5,809,251 A | * 9/1998 | May et al. | 709/223 |
| 5,909,689 A | * 6/1999 | Van Ryzin | 707/203 |
| 5,931,909 A | * 8/1999 | Taylor | 709/221 |
| 5,951,462 A | * 9/1999 | Yamanaka | 600/118 |
| 5,999,741 A | * 12/1999 | May et al. | 717/173 |
| 6,094,698 A | * 7/2000 | Namikawa | 710/74 |
| 6,446,082 B1 | * 9/2002 | Arita | 707/104.1 |

FOREIGN PATENT DOCUMENTS

JP 5-176884 7/1993

OTHER PUBLICATIONS

Christopher E. Strangio, "RS232 Standards," Copyright 1993–1997, [online], www.camiresearch.com/Data_Com_Basics/RS232_standard.html.*

Ron Clark and Bob Underwood, "RS–232C/422/485 line isolation solves more than fault problems," Sep. 28, 1995, [online] www.e–insite.net/ednmag/archives/1995/092895/20d f3.htm.*

* cited by examiner

Primary Examiner—Thomas Lee
Assistant Examiner—Mark Connolly
(74) Attorney, Agent, or Firm—Clifford Chance US LLP

(57) ABSTRACT

In an electronic endoscope adopting a two-microcomputer system, an operating program for the two microcomputers can be updated easily and with certainty, and the number of photocouplers for isolation can be reduced substantially. A patient-side circuit has a patient-side processing unit and a ROM installed in a socket. An IO-side circuit has an IO-side processing unit, a flash ROM and a RAM for storing a program-rewriting program transferred from the patient-side processing unit. The both processing units adopt a start-stop synchronization communication method and are connected to each other by two signal lines via signal conversion circuits and an isolation circuit. Upon updating a program in the microcomputer in the IO-side circuit, the patient-side processing unit reads the program-rewriting program and the update operating program from the ROM and transfers to the IO-side processing unit. The IO-side processing unit expands the program-rewriting program in the RAM and writes the update operating program in the flash ROM.

17 Claims, 8 Drawing Sheets

MULTI-MICROCOMPUTER SYSTEM

BACKGROUND OF THE INVENTION

1. Field of the Invention

The present invention relates to a multi-microcomputer system comprising a plurality of microcomputers and used in electronic apparatuses such as domestic appliances and electronic endoscopes.

2. Description of the Related Art

Microcomputers storing operating programs in accordance with various purposes have been installed in various kinds of electronic apparatuses, namely in domestic appliances such as TV sets and VCRs, and in electronic medical apparatuses such as cardiographs and endoscopes, for example. In order to prevent electric shocks from being applied to a human body, some of these electronic apparatuses have "isolation means" for isolating a circuit thereof in a portion made of a material that a human body is in direct contact with from a circuit thereof in a portion operating by the power supplied from an alternating current source, or for isolating the circuit from an external apparatus. Especially, for electronic medical apparatuses such as cardiographs and endoscopes, isolation of a portion of a cardiograph to be in direct contact with a human body or a scope unit of an electronic endoscope from a ground circuit is defined in a safety standard (IEC60601-1, JIS T1001, UL2601-1, for example).

For example, an electronic endoscope comprises a scope unit having imaging means such as a CCD imaging element located at the end thereof, and a video processor unit for processing a signal obtained by the scope unit and for outputting the processed signal to an output apparatus such as an image monitor connected to the endoscope. The isolation means is generally located in the video processor unit. The isolation means is installed in order to isolate the scope unit from an operation switch on the front of an enclosure containing the video processor unit and from an external apparatus such as the output apparatus like the image monitor described above. A microcomputer is located in either a circuit on a scope-unit side (hereinafter called a patient-side circuit) within the video processor unit or in a circuit within the external apparatus or the operation switch isolated by the isolation means (hereinafter called an IO[Input/Output]-side circuit). Since the microcomputer mainly controls the imaging means and the signal processing, the microcomputer is generally located in the patient-side circuit.

When the microcomputer is located in the patient-side circuit, the isolation means (an isolation unit) such as a photocoupler is necessary for each signal line (such as a data line and a control line) between the microcomputer and the operation switch or between the microcomputer and the external apparatus. Communication between the microcomputer and the external apparatus is carried out as serial communication or parallel communication in accordance with a communication protocol of the external apparatus. In the case of parallel communication, the number of photocouplers in the isolation means becomes much larger than in the case of serial communication, since each of multiple signal lines needs to be isolated. Since the microcomputer in the endoscope needs to deal with the communication protocol of the external apparatus, reduction in the number of photocouplers by entirely adopting serial communication with the external apparatus is impossible. In the case where the kind of external apparatuses which can be connected to the microcomputer is increased, the isolation means needs to be installed for each of the external apparatuses, due to a difference in the communication protocol. Therefore, the number of photocouplers further increases in some cases.

When the isolation unit such as a photocoupler is mounted on a circuit board, an area occupied by the isolation unit for each signal line is large and a distance for isolation needs to be reserved. Therefore, the number of parts increases and the electronic apparatus becomes large. As a result, the larger the number of the signal lines becomes, the lower the reliability of the entire apparatus becomes.

In order to solve this problem, a multi-microcomputer system can be used for an electronic endoscope. In this system, a main microcomputer is located in the patient-side circuit and a sub-microcomputer is also located in the IO-side circuit. The sub-microcomputer in the IO-side circuit carries out processing between the system and the external apparatus or between the system and the operation switch. In this manner, no direct communication between the main microcomputer in the patient-side circuit and the external apparatus can be carried out, and the number of photocouplers is thus reduced.

However, if a multi-microcomputer system is adopted, new data lines and control lines between the main microcomputer and the sub-microcomputer are necessary. Each data line or control line needs to have a photocoupler or the like in this case, and the number of isolation units may not necessarily be reduced as a result.

Meanwhile, in order to add a more convenient function or to manage a new scope unit or external apparatus, an electronic apparatus mounting a microcomputer enables update or upgrade of an operating program thereof in some cases. By appropriately improving the operating program, functions of the apparatus are enriched and convenience of the apparatus is improved. For example, in the case of an endoscope, when a new scope unit is adopted or a new external apparatus is managed, version-up is necessary.

The operating program can be updated by exchanging an old ROM (Read Only Memory) storing the current operating program with a new ROM storing a new operating program, by using an IC socket on a circuit board which can install the ROM storing the operating program.

However, in the case where the multi-microcomputer system uses ROMs of the same shape, which of the ROMs needs to be changed may not be obvious. For example, an old ROM for the main microcomputer may be changed to a new ROM for the sub-microcomputer. Furthermore, management of the ROM's becomes troublesome.

The present invention has been conceived based on consideration of the above problems. A first object of the present invention is to provide a multi-microcomputer system enabling update of an operating program of each microcomputer therein by using a simple method and not causing a problem in ROM management or erroneous insertion of a ROM.

A second object of the present invention is to provide a multi-microcomputer system enabling further reduction in the number of isolation units.

Recently, a multi-microcomputer system using a plurality of microcomputers in order to improve efficiency in processing or the like has also been proposed. When a multi-microcomputer system is employed by an electronic endoscope, two forms are possible. One is to place a main microcomputer in a patient-side circuit and to place a sub-microcomputer in an IO-side circuit, and the other is vice versa.

When exchanging ROM's, an enclosure of the system is opened, with the power being OFF. After an old ROM storing a current operating program is detached from an IC socket, a new ROM storing a new operating program is installed. This operation is troublesome.

When the multi-microcomputer system is used, new data lines and control lines between a main microcomputer and a sub-microcomputer are necessary. For each of the lines, an isolation unit such as a photocoupler needs to be installed. Therefore, the number of the isolation units increases.

The present invention has been conceived based on consideration of the above problems, and a third object of the present invention is to provide a multi-microcomputer system enabling reduction in the number of isolation units and update of an operating program of each microcomputer by a simple operation without causing a problem in ROM management.

SUMMARY OF THE INVENTION

A first multi-microcomputer system of the present invention achieving the first object described above enables update of an operating program of a slave microcomputer by transferring an operating program for updating (hereinafter called update operating program) read from a memory for updating (hereinafter called update memory) and by rewriting the operating program of the slave microcomputer with the update operating program for the slave microcomputer in the case where the update memory storing the operating program for the slave microcomputer is installed in a master circuit. In other words, the first multi-microcomputer system of the present invention is a multi-microcomputer system formed with the master microcomputer and the slave microcomputer. The system comprises:

a socket for installing the update memory storing the update operating program in the master circuit in which the master microcomputer is located; and the master microprocessor comprises:

a master processing unit for judging whether or not the update operating program for the slave microcomputer is stored in the update memory when the update memory is installed in the socket, and for transferring the update operating program to a slave circuit having the slave microcomputer therein in the case where the memory has been judged to store the update operating program; while the slave microcomputer comprises:

a program memory for storing a current operating program; and a slave processing unit for updating the current operating program with the update operating program when the update operating program is transferred.

The "master microcomputer" herein referred to means a microcomputer for transferring the update operating program read from the update memory to the slave microcomputer which is separated form the master microcomputer, as has been described above. Meanwhile, the "slave microcomputer" means a microcomputer for rewriting the current operating program with the update operating program having been transferred. A microcomputer carrying out main processing of an apparatus is generally called a main microcomputer and a microcomputer carrying out processing other than the main processing is called a sub-microcomputer. The master and slave microcomputers are different from the main microcomputer and the sub-microcomputer. Therefore, the main microcomputer and the sub microcomputer may be the master and slave microcomputers respectively in some cases, while a sub-microcomputer may be the master microcomputer in other cases. The number of slave microcomputers is not limited to one and a plurality of the slave microcomputers may be used.

To "update the current operating program with the update operating program" means to rewrite program data within the program memory with program data different from the program data of the current operating program. At the time of this rewriting, any method such as non-segmented copy (complete rewriting), partial copy (partial rewriting), and patching (addition of a correction program) can be adopted.

When judgment as to "whether or not the update operating program for the slave microcomputer is stored" is carried out, any method such as referring to a key input by an operator may be used. However, it is preferable for the system to carry out automatic judgment adopting the following method in order not to cause a problem for an operator or in order to avoid carrying out unnecessary program transfer.

In other words, the slave processing unit transfers version information of the current operating program to the master processing unit and the master processing unit reads version information of the update operating program from the update memory and judges whether the update operating program for the slave microcomputer is stored in the update memory by comparing the version information of the update operating program having been read with the version information of the current operating program having been transferred.

The "version information" means information enabling distinction between the content of update operating program and the current operating program when the two programs are different from each other. As this version information, an identification name of each operating program may be used if available. Alternatively, a time stamp may be used.

In the first multi-microcomputer system of the present invention, it is preferable for the update memory to store a program for rewriting a program (hereinafter called program-rewriting program) so that the master processing unit can read the program-rewriting program from the update memory when the update memory is installed in the socket and can transfer the program having been read to the slave circuit. Furthermore, it is also preferable for the slave microcomputer to comprise a memory for expansion (hereinafter called an expansion memory) for storing the program-rewriting program so that the master processing unit can write the program-rewriting program having been transferred in the expansion memory and updates the operating program by using the program-rewriting program having been written in the expansion memory.

Moreover, it is preferable for the first multi-microcomputer system of the present invention to carry out signal transmission between the both microcomputers according to start-stop synchronization communication which is a kind of serial communication methods so that the communication can be carried out using a lower number of signal lines. For this purpose, it is preferable for the system to be configured in the following manner. In other words, the system comprises a first signal conversion circuit for outputting parallel data input from the master processing unit to the slave circuit after converting the data into a start-stop synchronization signal and for outputting a start-stop synchronization signal input from the slave circuit to the master processing unit after converting the signal into parallel data, and a second signal conversion circuit for outputting parallel data input from the slave processing unit to the master circuit after converting the data into a start-stop synchronization signal and for outputting a start-stop synchronization signal input from the master circuit to the slave processing unit after converting the signal into parallel data.

If the first and the second signal conversion units are formed with asynchronous data transfer LSI's having functions of parallel-serial conversion and serial-parallel conversion, that is, with universal asynchronous receiver transmitters (UART's) more specifically, the signal conversion circuits can be configured in an extremely simple manner.

It is also preferable for the system to comprise isolation means for electrically isolating the first signal conversion circuit from the second signal conversion circuit so that the master circuit in which the master microcomputer is located and the slave circuit in which the slave microcomputer is located are electrically isolated from each other.

A second multi-microcomputer system of the present invention achieving the second object described above carries out signal transmission between a master microcomputer and a slave microcomputer according to the start-stop synchronization method which is a serial communication method, and enables substantial reduction in the number of isolation units by installing the isolation units for signal lines of 2 systems, namely input and output systems for the start-stop synchronization communication. In other words, the second multi-microcomputer system of the present invention is a multi-microcomputer system formed with a master microcomputer and a slave microcomputer, and the second multi-microcomputer system comprises a first signal conversion circuit for outputting parallel data input from the master microcomputer to the slave microcomputer after converting the data into a start-stop synchronization signal and for outputting a start-stop synchronization signal input from the slave microcomputer to the master microcomputer after converting the signal into parallel data, a second signal conversion circuit for outputting parallel data input from the slave microcomputer to the master microcomputer after converting the data into a start-stop synchronization signal and for outputting a start-stop synchronization signal input from the master microcomputer to the slave microcomputer after converting the signal into parallel data, and isolation means for electrically isolating the first signal conversion circuit from the second signal conversion circuit.

If the first and second signal conversion circuits are formed with asynchronous data transfer LSI's having functions of parallel-serial conversion and serial-parallel conversion, that is, with UART's more specifically, the signal conversion circuits can be configured in an extremely simple manner.

It is preferable for the first or second multi-microcomputer system having the isolation means to be applied to an electronic endoscope having imaging means at the end thereof and having the master and slave microcomputers in a scope-side circuit and in a circuit for interface with externally-connected apparatus, respectively.

According to the first multi-microcomputer system of the present invention, the update operating program read from the update memory is transferred to the slave microcomputer when the update memory storing the update operating program for the slave microcomputer is installed in the socket of the master circuit, and updates the operating program of the slave microcomputer by rewriting the operating program with the update operating program having been transferred. Therefore, by installing in turns in the socket each update memory storing the update operating program for each microcomputer, the operating program of each microcomputer can be updated, and erroneous insertion or troublesome management of ROM's are avoided.

Furthermore, if which program needs to be updated and which operating programs are old or new are judged automatically by the version comparison, the slave microcomputer does not transfer an unnecessary update operating program which would not actually be used, and erroneous rewriting of the operating program is prevented. In this manner, a plurality of operating programs for a plurality of the microcomputers can be updated easily and with certainty.

If not only the update operating program but also the program-rewriting program are transferred, appropriate update processing in accordance with the form of the update operating program can be realized. For example, the update operating program may be stored in the update memory as compressed data and a program-rewriting program of a decompression algorithm corresponding to the compression algorithm may be transferred to expand the update operating program. Therefore, the update memory storing the update operating program using any compression algorithm can be supplied. Moreover, if the program-rewriting program is necessarily stored in the update memory and transferred to the slave microcomputer after being read from the update memory, it becomes needless to store the program-rewriting program in the program memory in the slave microcomputer, and the memory space saved in this manner can be used as an area for storing a program. In this manner, the program memory can be used efficiently.

Furthermore, if the signal transmission between the both microcomputers is carried out according to the start-stop synchronization communication method, the number of signal lines connecting the two microcomputers is reduced substantially. In this case, the master circuit having the master microcomputer therein is isolated from the slave circuit having the slave microcomputer therein by the isolation unit for the 2-system signal lines of input and output for start-stop synchronization communication, and the number of isolation units can also be reduced.

If the signal conversion circuits are formed with the asynchronous data transfer LSI's having the serial-parallel and parallel-serial conversion functions, the configuration of the signal conversion circuits can be made extremely simple.

Meanwhile, according to the second multi-microcomputer system of the present invention, the signal conversion circuits are formed to transmit a signal according to the start-stop synchronization communication which is the serial communication method between the master and the slave microcomputers, and the isolation units are formed for the 2-system signal lines of input and output for the start-stop synchronization communication. Therefore, not only update of the operating program but also other processing can be carried out bidirectionally with the signal lines. As a result, the number of the isolation units can be reduced substantially.

When connecting an apparatus adopting the multi-microcomputer system of the present invention with an external apparatus, if the external apparatus is connected with the slave circuit which is electrically isolated from the master circuit and if the external apparatus is directly controlled by the slave microcomputer in the slave circuit, the master and slave microcomputers can be connected by start-stop synchronization communication using the 2-system signal lines, regardless of a communication protocol adopted by the external apparatus being serial or parallel, or regardless of a difference in communication protocols between external apparatuses. Therefore, without increasing the number of isolation units such as the photocouplers, the master circuit is isolated from the external apparatus and various forms of communication protocols adopted by external apparatuses can be dealt with. In this manner, a system having flexible extensibility can be configured.

If the first or the second multi-microcomputer system having the isolation means is used in a circuit in an endoscope having imaging means at the end thereof, that is, if the system is used in an endoscope having the master microcomputer in the patient-side circuit and the slave microcomputer in the IO-side circuit which is an interface with the external apparatus, the endoscope enables easy and secure update of the operating program of the two microcomputers by using the single socket. In this manner, functions of the endoscope can be extended easily and the convenience thereof improves.

Since the communication with the external apparatus can be assigned to the slave microcomputer, regardless of the communication protocol of the external apparatus, the number of isolation units can be reduced substantially between the master and slave microcomputers, that is, between the patient-side circuit and the IO-side circuit.

A third multi-microcomputer system of the present invention achieving the third object described above transfers to a slave microcomputer an update operating program when the program is transferred to a master circuit from an apparatus connected externally with an electronic apparatus mounting the system, and a current operating program of the slave microcomputer is updated by being replaced with the update operating program having been transferred.

In other words, the third multi-microcomputer system of the present invention is a multi-microcomputer system formed with a master microcomputer and a slave microcomputer, and the system comprises:

a signal level conversion circuit for outputting a signal output from a master circuit having the master microcomputer therein to an external apparatus after converting the signal into a signal of a voltage level of the external apparatus and for outputting a signal input from the external apparatus to the master circuit after converting the signal from the external apparatus into a signal of a voltage level of the master circuit.

The master microcomputer comprises a master processing unit for judging whether or not an update operating program is for the slave microcomputer when the program is transferred from the external apparatus via the signal level conversion circuit, and for transferring the update operating program to a slave circuit having the slave microcomputer therein in the case where the program has been judged to be for the slave microcomputer; and the slave microcomputer comprises a program memory storing a current operating program and a slave processing unit for updating the current operating program thereof with the update operating program when the update operating program is transferred.

The "master microcomputer" herein referred to means a microcomputer for transferring the update operating program having been transferred from the external apparatus to the slave microcomputer which is different from the master microcomputer.

The signal level conversion by the signal level conversion circuit refers to either magnitude conversion or potential level conversion of the signal, or both.

When judging "whether or not the update operating program is for the slave microcomputer", any method such as referring to a key input by an operator may be used. However, in order not to trouble an operator and not to transfer unnecessary programs, it is preferable for the system to carry out automatic judgment according to the following method. In other words, the slave processing unit transfers version information of the current operating program to the master processing unit and the master processing unit obtains version information of the update operating program and judges whether or not the update operating program is for the slave microcomputer by comparing the version information of the update operating program with the version information of the current operating program having been transferred.

It is preferable for the system to automatically obtain the version information of the update operating program by referring to the program transferred from the external apparatus.

It is preferable for the third multi-microcomputer system of the present invention to be configured in the following manner. That is, the master processing unit transfers a program-rewriting program to the slave circuit when the program-rewriting program is transferred from the external apparatus via the signal level conversion circuit and the slave microcomputer comprises an expansion memory for storing the program-rewriting program so that the master processing unit writes the program-rewriting program having been transferred in the expansion memory and updates the operating program by using the program-rewriting program having been written in the expansion memory.

In the third multi-microcomputer system of the present invention, it is preferable for the signal level conversion circuit to carry out signal level conversion according to the RS-232C standard.

Furthermore, it is preferable for the third multi-microcomputer system of the present invention to carry out signal transmission between the two microcomputers according to the start-stop synchronization communication which is a serial communication method, so that the communication can be carried out by using a lower number of signal lines. For this purpose, the system comprises a first signal conversion circuit for outputting parallel data input from the master processing unit to the slave circuit after converting the data into a start-stop synchronization signal and for outputting a start-stop synchronization signal input from the slave circuit to the master processing unit after converting the signal into parallel data, and a second signal conversion circuit for outputting parallel data input from the slave processing unit to the master circuit after converting the data into a start-stop synchronization signal and for outputting a start-stop synchronization signal input from the master circuit to the slave processing unit after converting the signal into parallel data.

If the first and the second signal conversion units are formed with asynchronous data transfer LSI's having functions of parallel-serial conversion and serial-parallel conversion, that is, with UART's more specifically, the signal conversion circuits can be configured in an extremely simple manner.

It is preferable for the system to further comprise isolation means for electrically isolating the first and second conversion circuits from each other so that the master circuit having the master microcomputer therein is electrically isolated from the slave circuit having the slave microcomputer therein.

It is also preferable for the multi-microcomputer system having the isolation means described above to be applied to an endoscope having the master microcomputer and the slave microcomputer in a scope-side circuit having imaging means at the end thereof and in a circuit for interface with the apparatus externally connected thereto, respectively.

According to the third multi-microcomputer system of the present invention, when the update operating program for slave microcomputer is transferred from the external apparatus to the master circuit, update of the operating program for the slave microcomputer becomes possible by transferring the update operating program to the slave microcomputer and by rewriting the operating program of the slave microcomputer with the update operating program. Therefore, update of the operating program for each microcomputer becomes possible by transferring the update operating program to the corresponding microcomputer when the program is transferred from the external apparatus.

Furthermore, ROM exchange is not necessary and erroneous insertion of ROM and a problem associated with ROM management are avoided. Moreover, since the update operation can be carried out with the power being ON and without opening an enclosure, the operation becomes easier.

If not only the update operating program but also the program-rewriting program are transferred, appropriate update processing can be carried out in accordance with the form of the update operating program. For example, the update operating program may be transferred as compressed data and a program-rewriting program of decompression algorithm corresponding to the compression algorithm may be used to expand the update operating program. Therefore, the update operating program can be transferred by using any compression algorithm and the time necessary for transferring the update operating program becomes shorter. Moreover, if it the program-rewriting program is necessarily transferred to the master microcomputer and then to the slave microcomputer, it becomes needless to store the program-rewriting program in the program memory in the slave microcomputer, and the memory space saved in this manner can be used as an area for storing a program for other processing. In this manner, the program memory can be used efficiently.

If the signal level conversion is carried out according to the RS-232C standard, it becomes possible for the electronic apparatus mounting this system to be connected to the external apparatus via an RS-232C line which is a general purpose interface. As a result, a general purpose apparatus such as a personal computer can be used as an apparatus to transfer the update operating program to the master microcomputer, which improves convenience.

If the multi-microcomputer system having the isolation means is used in an endoscope having imaging means at the end thereof, that is, if the system is used in an endoscope having the master microcomputer in a scope-side circuit which is a patient-side circuit and having the slave microcomputer in an IO-side circuit which is an interface with external apparatus, the endoscope enables easy and secure update of the operating program of the both microcomputers by using the external apparatus. In this manner, functions of the endoscope can be extended easily and the convenience thereof improves.

DESCRIPTION OF THE PREFERRED EMBODIMENTS

Figure 1:
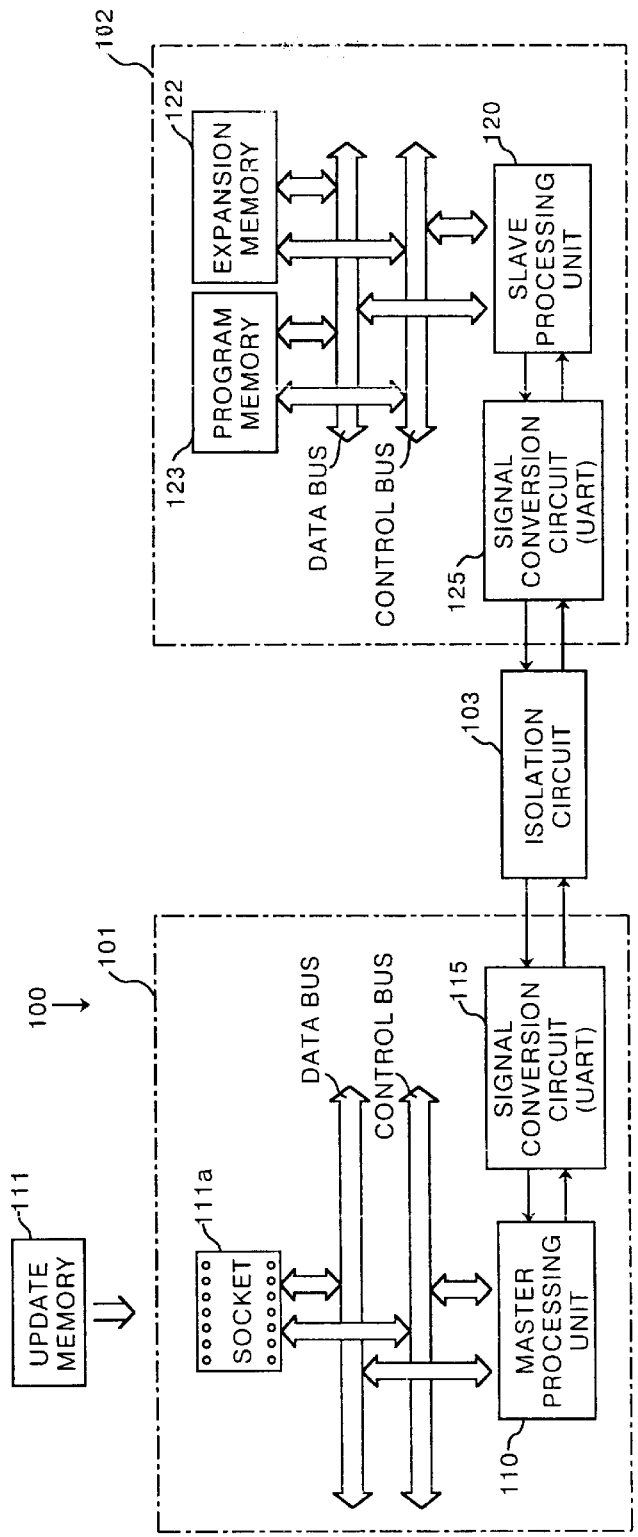
FIG. 1 is a block diagram showing a configuration of a multi-microcomputer system according to an embodiment of the present invention

Hereinafter, embodiments of the present invention will be explained in detail with reference to the accompanying drawings. FIG. 1 is a block diagram showing a configuration of a multi-microcomputer system according to an embodiment of the present invention.

As shown in FIG. 1, a multi-microcomputer system 100 in this embodiment comprises a master circuit 101, a slave circuit 102, and an isolation circuit 103 existing between the master and slave circuits.

The master circuit 101 in which a master microcomputer is located comprises a master processing unit 110 and a socket 111a enabling installation of an update memory 111 loaded with an update operating program. As is obvious from this, the master microcomputer comprises the master processing unit 110 and the update memory 111. The update memory 111 in this embodiment includes not only the update operating program but also a program-rewriting program. The master circuit 101 comprises a ROM storing a current operating program of the master microcomputer, a RAM (a memory for reading and writing) as an expansion memory and as a work area for the master microcomputer, I/O'S as interface units for peripheral circuits, and the like, which are not shown in FIG. 1.

The slave circuit 102 in which the slave microcomputer is located comprises a slave processing unit 120, a program memory 123 for storing a current operating program, and an expansion memory 122 for storing the program-rewriting program transferred from the master circuit 101. As the expansion memory 122, a work RAM used in normal processing can be used. The slave circuit 102 has I/O'S as interface units for peripheral circuits, and the like, which are not shown in FIG. 1.

The master circuit 101 also comprises a signal conversion circuit 115 for outputting to the slave circuit 102 parallel data input from the master processing unit 110 after converting the data into a start-stop synchronization signal and for outputting to the master processing unit 110 a start-stop synchronization signal input from the slave circuit 102 after converting the signal into parallel data. The slave circuit 102 has a signal conversion circuit 125 for outputting to the master processing unit 110 parallel data input from the slave processing unit 120 after converting the data into a start-stop synchronization signal and for outputting to the slave processing unit 120 a start-stop synchronization signal input from the master processing unit 110 after converting the signal into parallel data.

The signal conversion circuits 115 and 125 carry out conversion between the parallel data and the start-stop synchronization signal which is serial data, and need bidirectional data transmission. Therefore, both conversion circuits are formed with UART's which are asynchronous data transmission LSI's having both the parallel-serial conversion and the serial-parallel conversion functions.

In the isolation circuits 103, in order to isolate the signal conversion circuits 115 and 125 from each other, one isolation unit is installed for each of start-stop synchronization signal lines of input and output connecting the two conversion circuits 115 and 125. As the isolation unit, a photocoupler or an isolation transformer or the like can be used. In an actual system, the isolation units are installed for not only the start-stop synchronization signal lines between the two signal conversion circuits 115 and 125 but also other signal lines such as a video signal line so that isolation between the master circuit 101 and the slave circuit 102 is secured.

Program updating processing in the system 100 will be explained next.

An operator (not shown in FIG. 1) installs the update memory 111 loaded with the update operating program in the socket 111*a* of the master circuit 101 while the power of the apparatus mounting the system is OFF, and then turns the power ON.

The master processing unit 110 and the slave processing unit 120 carry out initial processing respectively, and the slave processing unit 120 stands by until an interrupt occurs. The master processing unit 110 carries out pre-transmission processing when the power is turned on with the update memory 111 being installed in the socket 111*a*. In other words, the master processing unit 110 judges whether or not the update operating program for the slave microcomputer is loaded in the update memory 111. In the case where the program has been judged to be loaded, the master processing unit 110 transfers the update operating program to the slave circuit 102. In the case where the update operating program loaded in the memory 111 has been judged to be for the master processing unit, the master processing unit 110 shifts to a mode for updating a program of its own.

As a method for this judgment, the operator who makes this judgment may input a key. However, it is preferable for the system to carry out automatic judgment in the following manner. In other words, the master processing unit 110 requests from the slave processing unit 120 transfer of version information of the current operating program of the slave microcomputer. In response to the request of the master circuit 101, that is, the request of the master processing unit 110, the slave processing unit 120 transfers to the master processing unit 110 the version information of the current operating program stored in the program memory 123, via the signal conversion circuits 115 and 125 and the isolation circuit 103.

The master processing unit 110 reads version information of the update operating program from the update memory 111, and compares the version information having been read with the version information of the current operating program transferred from the slave circuit 102, that is, from the slave processing unit 120. When the update operating program is newer than the current operating program, the update memory 111 is judged to include the update operating program for the slave microcomputer. Upon comparison of the version information, an identification name of each operating program or a time stamp is used.

The pre-transmission processing is carried out in this manner, and the program updating processing which will be described later is carried out only in the case where the update operating program in the memory 111 is for the slave microcomputer and newer than the current operating program. In this manner, an update operating program which cannot be rewritten by the slave microcomputer is not transmitted to the slave microcomputer.

Furthermore, rewriting of the operating program of the slave microcomputer with the update operating program for the master microcomputer or with an old-version operating program is prevented. If automatic processing is carried out in the above manner, the operator's labor is saved.

In the case where the update operating program is for the slave microcomputer, it is possible for the master microcomputer to immediately transfer the update operating program to the slave microcomputer without judging its version to cause the slave microcomputer to judge the version, although this is not efficient.

In a system where the apparatus comprising the master circuit 101 is connected to a separate apparatus comprising the slave circuit 102 by a cable or the like, it is preferable for the system to comprise means for confirming connection between the circuits 101 and 102 so that processing in accordance with a state of connection can be carried out. In other words, the pre-transmission processing described above and the program updating processing which will be described later is carried out only in the case where the two circuits are connected to each other, and processing is suspended without execution of the pre-transmission processing or the like when the two circuits are not connected to each other.

The master processing unit 110 shifts to the processing for updating the operating program of the slave microcomputer in the case where the update operating program has been judged to be for the slave microcomputer in the pre-transmission processing. In other words, the master processing unit 110 judges whether or not the program-rewriting program is loaded in the update memory 111, and reads the program-rewriting program from the memory 111 in the case where the program-rewriting program is loaded. The master processing unit transfers the program-rewriting program having been read to the slave circuit 102 via the signal conversion circuits 115 and 125 and the isolation circuit 103. The slave processing unit 120 writes the program-rewriting program having been transferred from the master circuit 101 in the expansion memory 122, and updates the operating program thereof by using the program-rewriting program in a manner which will be explained later.

In the case where the program-rewriting program is not transferred from the master circuit 101, the slave processing unit 120 writes a program-rewriting program stored in the program memory 123 in the expansion memory 122, and updates the operating program.

As has been described above, if not only the update operating program but also the program-rewriting program are transferred, processing in accordance with the form of the update operating program can be carried out. For example, when the update operating program is stored in the update memory 111 as compressed data, a decompression program corresponding to the compression algorithm is transferred to decompress the update operating program. Therefore, any compression algorithm can be used. Furthermore, if the program-rewriting program is necessarily stored in the update memory 111 and transferred, only portions for general processing in the slave circuit 102 (a true operating program) and for writing the program-rewriting program in the expansion memory 122 are stored in the program memory 123 as the operating program. As a result, unnecessary program portions not used normally, such as for receiving the update operating program or for writing the update operating program in the program memory 123, are not stored in the program memory 123, which leads to efficient use of the memory 123.

After writing the program-rewriting program by the slave circuit 102 is completed, the master processing unit 110 reads the update operating program from the update memory 111 and transfers the update operating program having been read to the slave circuit 102 via the signal conversion circuits 115 and 125 and the isolation circuit 103. The slave processing unit 120 updates the current operating program with the update operating program by writing in the program memory 123 the update operating program having been transferred thereto from the master circuit 101. If the size of the update operating program is larger then a rewrite unit of the program memory 123, program transfer and writing is carried out by dividing the update operating program by the rewrite unit.

As has been described above, the master circuit 101 reads the update operating program for the slave microcomputer from the update memory 111 installed in the socket 111a, and transfers the update operating program having been read to the slave circuit 102. The transferred program is written in the program memory 123. In this manner, update of the operating program can be carried out easily for the slave microcomputer located in the slave circuit 102 not having the socket for installing the update memory.

Furthermore, by installing the update memory storing the update operating program for each of the microcomputers in turns in the socket, update of the operating programs for the two microcomputers can be dealt with. Therefore, erroneous insertion and troublesome ROM management do not occur.

Moreover, by automatically judging through version comparison which program memory needs to be updated or which operating program is new or old, unnecessary program transfer and erroneous update of the operating program are avoided.

As has been described above, according to the multi-microcomputer system of the present invention, the operating programs for a plurality of the microcomputers can be updated with certainty by simply installing the update memory storing the desired update operating program in the IC socket, and function extensibility and convenience can be improved.

If the interface between the two microcomputers is realized by using parallel signals, many control lines are necessary, and the number of isolation units is increased in proportion. However, according to the system of the present invention, signal connection (bidirectional communication) between the master processing unit 110 and the slave processing unit 120 is realized by using the start-stop synchronization signal which is a serial signal, not by using parallel signals. Therefore, the number of signal lines between the two processing units 110 and 120 is extremely small, which leads to a substantial reduction in the number of isolation units for isolating the master circuit 101 from the slave circuit 102. Furthermore, since UART's, which are general LSI's for conversion, are used for converting the parallel signals into the serial signal, the signal conversion circuits 115 and 125 become simple. Moreover, since the start-stop synchronization signals are used, a switching circuit for switching directions of a clock signal and isolation units for the clock signal are not necessary when compared with the case of clock synchronization communication which is also a serial communication method. Therefore, the isolation circuit 103 becomes simple.

The substantial reduction in the number of the isolation units is achieved not only in the update of the operating program but also in processing other than the update processing. Therefore, if the slave circuit is connected to an external apparatus and the slave microcomputer in the slave circuit directly controls the external apparatus, the two microcomputers can be connected by the two signal lines and the master circuit is isolated from the external apparatus, regardless of a communication protocol adopted by the external apparatus being serial or parallel, or regardless of a difference in communication protocols between external apparatuses.

Figure 2:
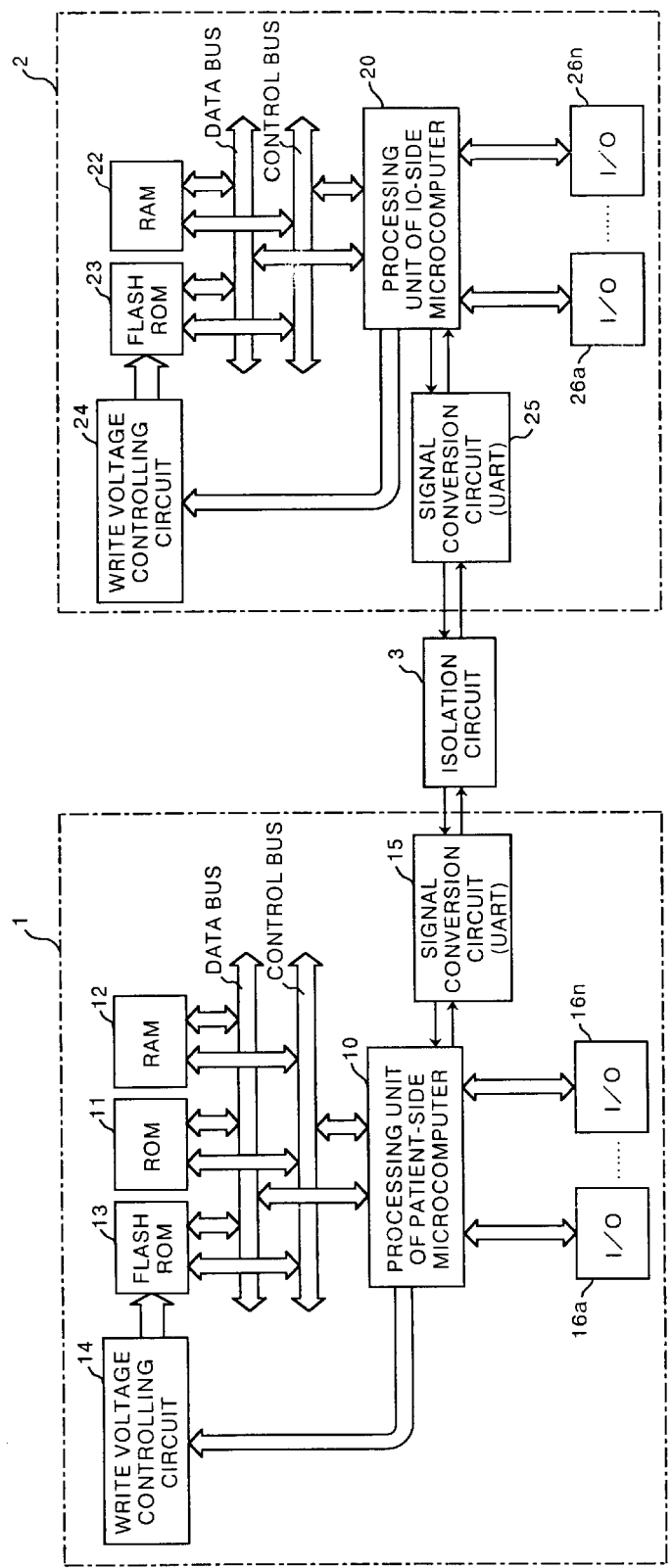
FIG. 2 is a block diagram showing a configuration of an endoscope adopting the multi-microcomputer system shown in FIG. 1.
Figure 3:
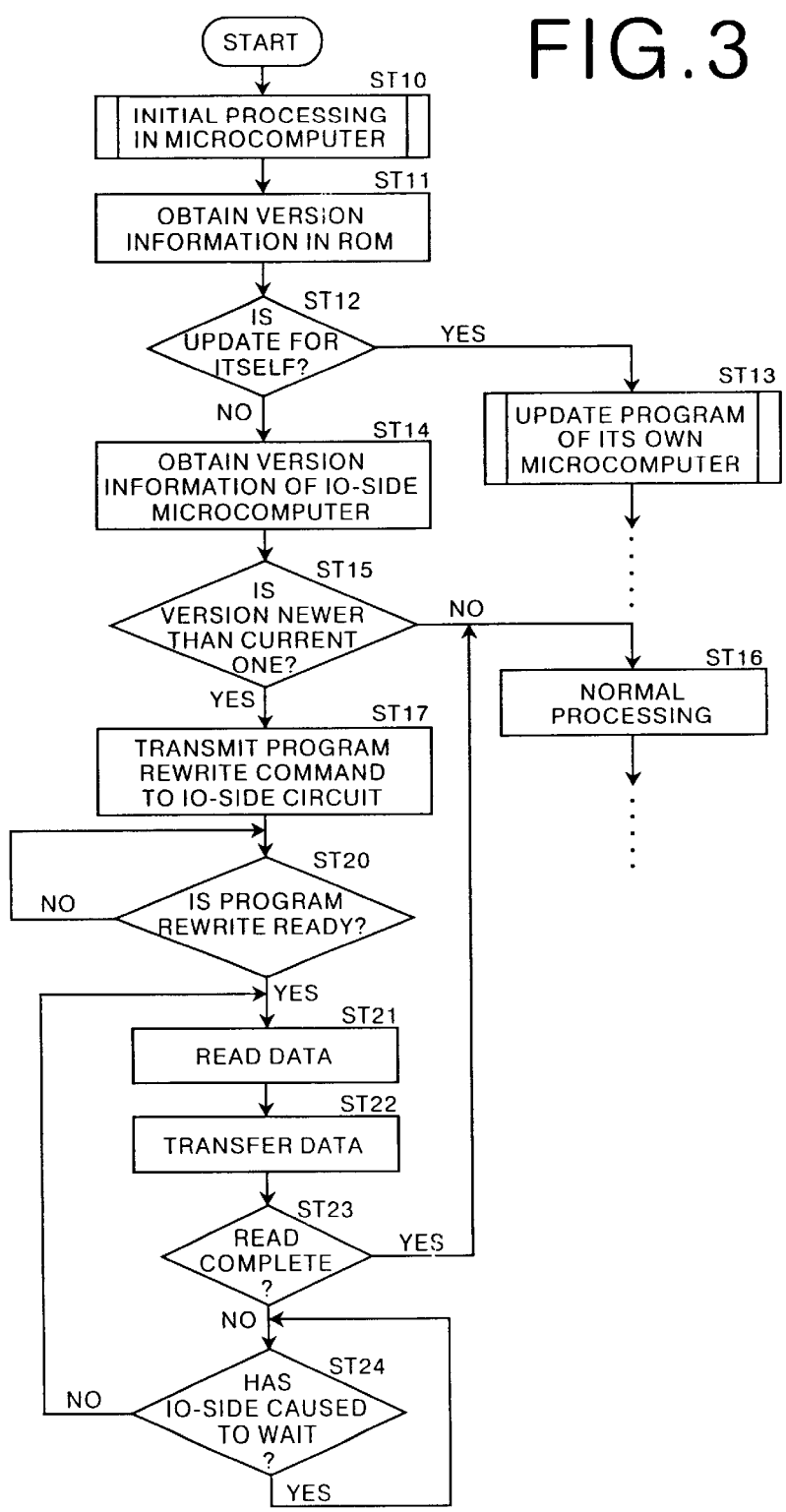
FIG. 3 is a flowchart showing program update processing by a patient-side circuit-in the case of the endoscope adopting the multi-microcomputer system shown in FIG. 1.
Figure 4:
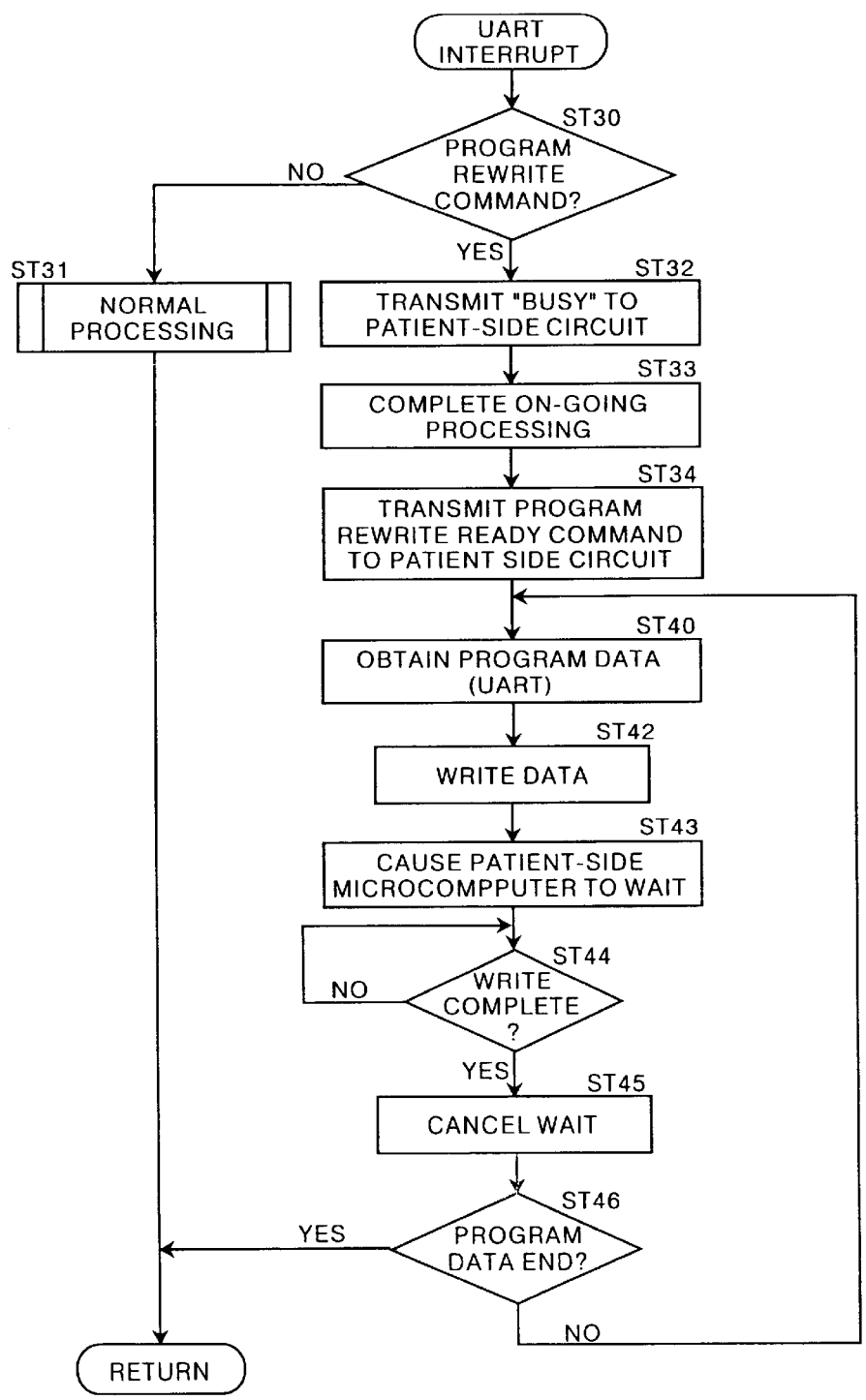
FIG. 4 is a flow chart showing program updating processing by an IO-side circuit in the case of the endoscope adopting the multi microcomputer system shown in FIG. 1.

A method of updating an operating program used in an electronic endoscope adopting the present invention will be explained with reference to FIGS. 2 to 4. FIG. 2 is a block diagram showing a portion of microcomputer circuits related to program updating in the electronic endoscope. FIG. 3 is a flow chart showing program updating processing in a patient-side circuit in the endoscope, and FIG. 4 is a flow chart for the same processing in an IO-side circuit therein.

As shown in FIG. 2, the microcomputer circuit of the endoscope roughly comprises a patient-side circuit 1 corresponding to the master circuit, an IO-side circuit 2 corresponding to the slave circuit, and an isolation circuit 3. The patient-side circuit 1 and the IO circuit 2 are connected to each other via the isolation circuit 3.

The patient-side circuit 1 is a circuit in a scope unit of the endoscope which has imaging means such as a CCD imaging element at the end thereof. The patient-side circuit 1 comprises a processing unit 10 of a patient-side microcomputer (hereinafter called a patient-side processing unit) corresponding to the master processing unit, a ROM 11 loaded with an update operating program and corresponding to the update memory, a RAM 12 corresponding to the expansion memory and the like for the master microcomputer, a flash ROM 13 storing an operating program for the patient-side microcomputer and corresponding to the program memory for the master microcomputer, a write voltage controlling circuit 14, a signal conversion circuit 15 comprising a UART and for outputting to the IO-side circuit 2 parallel data (including control data) input from the patient-side processing unit 10 after converting the data into a start-stop synchronization signal and for outputting to the patient-side processing unit 10 a start-stop synchronization signal input from the IO-side circuit 2 after converting the signal into parallel data (including control data), and I/O'S 16a~16n as interface units for peripheral circuits and the like. FIG. 2 shows a state where the ROM 11 has already been installed in an IC socket.

The IO-side circuit 2 is a circuit for interface with an apparatus connected externally to the endoscope. The IO-side circuit 2 comprises a processing unit 20 of an IO-side microcomputer (hereinafter called an IO-side processing unit) corresponding to the slave processing unit, a RAM 22 corresponding to the expansion memory, a flash ROM 23 storing an operating program for the IO-side microcomputer and corresponding to the program memory for the slave microcomputer, a write voltage controlling circuit 24, a signal conversion circuit 25 comprising a UART and for outputting to the patient-side circuit 1 parallel data (including control data) input from the IO-side processing unit 20 after converting the data into a start-stop synchronization signal and for outputting to the IO-side processing unit 20 a start-stop synchronization signal input from the patient-side circuit 1 after converting the signal into parallel data (including control data), and I/O'S 26a~26n as interface units for peripheral circuits, and the like.

In the isolation circuit 3, one isolation unit is used for each of start-stop synchronization signal lines of input and output connecting the both signal conversion circuits 15 and 25, in order to isolate the both conversion circuits from each other.

Processing for updating an operating program for the endoscope adopting the multi-microcomputer system will be explained with reference to the flow charts in FIGS. 3 and 4.

When the power is turned on, the patient-side processing unit 10 carries out its own initial processing (ST10). At this time, the IO-side processing unit 20 carries out its own initial processing and stands by until an interrupt from the patient-side circuit 1 occurs.

The patient-side processing unit 10 obtains version information from the ROM 11 loaded with the update operating program when the power is turned on with the ROM 11 being installed in the IC socket (ST11).

The version information includes information indicating whether the update operating program is for the patient-side circuit1or for the IO-side circuit 2. For example, the version information includes an ID for judgment and an identification name of the update operating program, or the ID and a time stamp of the program. The information may have an ID code indicating a serial number, the judgment ID, the identification name, the time stamp and the like.

The patient-side processing unit 10 judges whether the update operating program in the ROM 11 installed in the socket is for the patient-side circuit 1 or for the IO-side circuit 2, based on the version information having been obtained (ST12). If the program is for itself, the patient-side processing unit 10 shifts to processing for rewriting the operating program of its own (ST13).

Meanwhile, if the update operating program is for the IO-side circuit 2, the patient-side processing unit 10 interrupts the IO-side processing unit 20 and requests transfer of version information of the IO-side microcomputer from the IO-side processing unit 20. In other words, the patient-side processing unit 10 requests transfer of the identification name or the time stamp indicating the version information of the current operating program in the flash ROM 23, and obtains the version information of the flash ROM 23 (ST14).

The patient-side processing unit 10 compares the identification names or the time stamps between the version information of the flash ROM 23 transferred from the IO-side circuit 2 and the version information of the update operating program obtained at ST11. The patient-side processing unit judges whether or not the current operating program needs to be replaced with the update operating program, that is, whether or not the version of the update operating program is newer than that of the current operating program in the flash ROM 23. In the case where the version of the update operating program has been judged to be not newer than the current program in the flash ROM 23 and not in need of updating, no update processing is necessary. Therefore, the patient-side processing unit returns to normal processing (ST16). Meanwhile, in the case where the version of the update operating program has been judged to be newer than the current program and in need of updating, the patient-side processing unit 10 transmits a program rewrite command to the IO-side circuit 2 (ST17), and waits for transmission of a program rewrite ready command from the IO-side circuit 2 (ST20-NO). At this time, if the ROM 11 includes a program-rewriting program, the program-rewriting program is read from the ROM 11 and transferred to the IO-side circuit 2 via the signal conversion circuit 15, the isolation circuit 3, and the signal conversion circuit 25 in this order.

Having received the program rewrite command from the patient-side circuit 1 (ST30), the IO-side processing unit 20 transmits a BUSY command to the patient-side circuit 1 (ST32). The IO-side processing unit 20 then completes on-going processing (ST33), and transmits the program rewrite ready command to the patient-side circuit 1 after completion of the current processing (ST34). At this time, the IO-side processing unit 20 writes the program-rewriting program transferred from the patient-side circuit 1 in the RAM 22. In the case where the program-rewriting program is not transferred from the patient-side circuit 1, the IO-side processing unit 20 writes in the RAM 22 a program-rewriting program stored in the flash ROM 23. Meanwhile, when processing is interrupted, the IO-side processing unit 20 returns to normal processing (ST31) if the interrupt is not for receiving the program rewrite command.

Having received the program rewrite ready command from the IO-side circuit 2 (ST20-YES), the patient-side processing unit 10 reads program data from the ROM 11 (ST21), and transfers the data to the IO-side processing unit 20 (ST22). Having received the program data (ST40), the IO-side processing unit 20 updates the current operating program with the program data having been received. In other words, the IO-side processing unit 20 starts writing the program data in the flash ROM 23 while causing the patient-side processing unit 10 to wait, and cancels the wait by transmitting a cancel command to the patient-side processing unit 10 after completion of writing (ST42~45). The program data are written in the flash ROM 23 by controlling the write voltage controlling circuit 24.

The flash ROM 23 has a predetermined rewrite unit (such as 256 bytes) as one block. When the rewrite unit is accessed, other block spaces within the same chip are generally inaccessible. Based on this fact, program transfer from the patient-side circuit 1 to the IO-side circuit 2 is carried out according to the rewrite unit of the flash ROM 23. Therefore, if the size of the operating program in the update operating program is larger than the rewrite unit, transfer and writing is carried out several times by dividing the program.

More specifically, the patient-side processing unit 10 judges whether all the program data have been read from the ROM 11 by presence of an end code in the program data. In the case where the end code has been judged to exist, the patient-side processing unit returns to normal processing (ST16). On the other hand, in the case where the end code has been judged to be absent, data reading and transfer is continued unless the IO-side circuit 2 causes the patient-side processing unit to wait (ST24-NO, ST21, ST22). If the IO-side processing circuit 2 causes the patient-side processing unit 10 to wait, the processing unit waits until the wait state is cancelled by the cancel command from the IO-side circuit 2 (ST24-YES).

The IO-side processing unit 20 judges whether or not all the program data have been obtained by using the end code in the program data having been transferred. In the case where the end code has been judged to exist, the writing processing is terminated (ST46-YES). On the other hand, in the case where the end code has been judged to be absent, the steps ST40-46 are repeated after each completion of the data writing processing (ST46-NO).

As has been described above, in the case where the multi-microcomputer system of the present invention is applied to the endoscope, the operating program can be updated easily by transferring to the IO-side circuit 2 the update operating program for the IO-side microcomputer (slave microcomputer) read from the ROM (update memory) 11 installed in the IC socket of the patient-side circuit 1 (master circuit) in which the patient-side microcomputer is located, and by writing the program having been transferred in the flash ROM 23. Furthermore, erroneous program writing and a problem associated with management of the ROM 11 do not occur. Moreover, since the program data are updated by exchanging ROM's as has been carried out conventionally, the market easily accepts this method.

The patient-side processing unit 10 is connected to the IO-side processing unit 20 by a start-stop synchronization signal which is a serial signal. Therefore, the number of the isolation units for isolating the patient-side circuit 1 from the IO-side circuit 2 can be reduced substantially.

Upon converting the parallel signal into the serial signal, UART's which are general-purpose LSI's for conversion are used, and the signal conversion circuits 15 and 25 become simple.

The preferred embodiment of the multi-microcomputer system of the present invention has been described above. However, the present invention is not limited to the above embodiment and various modifications can be made thereto within the scope of the present invention.

For example, in the embodiment where the present invention is applied to the endoscope, the update operating program transferred from the patient-side circuit 1 is written in the flash ROM 23 in the IO-side circuit 2 in order to update the operating program of the IO-side microcomputer. However, regarding the update of the operating program, the opposite embodiment is also possible. In other words, the patient-side circuit 1 does not have the IC socket for the ROM 11 and the patient-side circuit 1 is used as the slave circuit. Meanwhile, the IO-side circuit 2 has an IC socket for installing the update memory, and the IO-side circuit 2 is used as the master circuit. An update operating program for the patient-side microcomputer is read from an update memory installed in the socket, and transferred to the patient-side circuit 1. By writing the update operating program having been transferred in the flash ROM 13, the operating program for the patient-side microcomputer can be updated.

The multi-microcomputer system of the present invention is applicable not only to the electronic endoscope but also to various kinds of electronic apparatuses, namely electronic medical apparatuses such as electro-cardiographs and domestic appliances such as TV sets and VCR's, for example. The number of slave microcomputers may not necessarily be limited to one and a plurality of slave microcomputers may exist. For each of the slave microcomputers, an update operating program therefor may be read from the update memory and transferred from the master microcomputer to the slave microcomputer. By writing the update operating program having been transferred in a program memory for the microcomputer, the operating program of the slave microcomputer can be updated individually.

Figure 5:
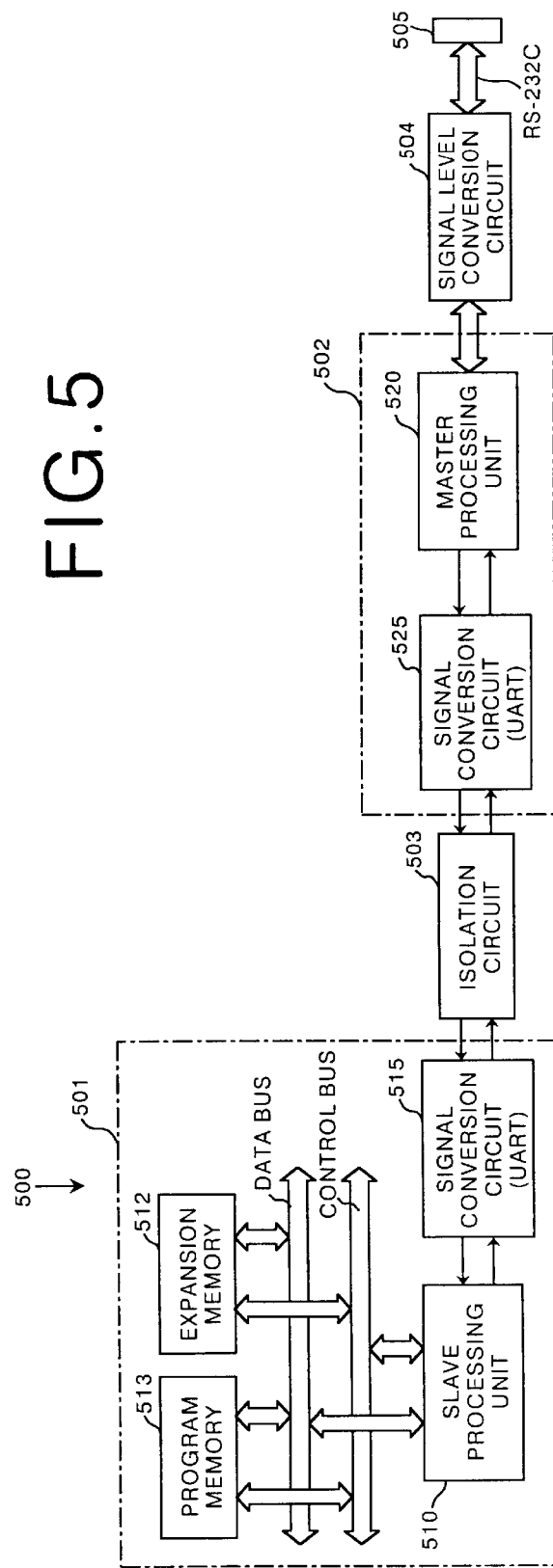
FIG. 5 is a block diagram showing a configuration of a multi-microcomputer system according to another embodiment of the present invention.

Hereinafter, another embodiment of the present invention will be explained in detail with reference to the accompanying drawings. FIG. 5 is a block diagram showing a configuration of a multi-microcomputer system according to the embodiment.

As shown in FIG. 5, a multi-microcomputer system 500 in this embodiment comprises a master circuit 502, a slave circuit 501, an isolation circuit 503 existing between the master and slave circuits, and a signal level conversion circuit 504.

The master circuit 502 in which a master microcomputer is located comprises a master processing unit 520. As is obvious from this, the master microcomputer is formed with the master processing unit 520. The master circuit 502 is connected to the signal level conversion circuit 504 for outputting a signal input from the master circuit 502 to an external apparatus not shown in FIG. 5 after converting the signal into a signal of a voltage level of the external apparatus and for outputting a signal input from the external apparatus to the master circuit 502 after converting the signal into a signal of a voltage level of the master circuit 502. A connector 505 connects the signal level conversion circuit to the external apparatus. The master circuit 502 comprises a ROM storing a current operating program of the master microcomputer, a RAM (a memory for reading and writing) as an expansion memory and as a work area for the master microcomputer, and I/O's as interface units for peripheral circuits, and the like, which are not shown in FIG. 5.

In this embodiment, the signal level conversion circuit 504 carries out signal level conversion according to the RS-232C standard. In other words, the external apparatus carries out serial communication according to the RS-232C standard. As this external apparatus, a personal computer or a dedicated instrument is preferably used. The external apparatus transfers not only an update operating program but also a program-rewriting program to the master circuit 502.

The slave circuit 501 in which the slave microcomputer is located comprises a slave processing unit 510, a program memory 513 for storing a current operating program, and an expansion memory 512 for storing the program-rewriting program transferred from the master circuit 502. As the expansion memory 512, a work RAM used in normal processing can be used. The slave circuit 501 has I/O'S as interface units for peripheral circuits, and the like, which are not shown in FIG. 5.

The slave circuit 501 has a signal conversion circuit 515 for outputting to the master circuit 502 parallel data input from the slave processing unit 510 after converting the data into a start-stop synchronization signal and for outputting to the slave processing unit 510 a start-stop synchronization signal input from the master circuit 502 after converting the signal into parallel data. The master circuit 502 also comprises a signal conversion circuit 525 for outputting to the slave circuit 501 parallel data input from the master processing unit 520 after converting the data into a start-stop synchronization signal and for outputting to the master processing unit 520 a start-stop synchronization signal input from the slave circuit 501 after converting the signal into parallel data.

The signal conversion circuits 525 and 515 carry out conversion between the parallel data and the start-stop synchronization signal which is serial data, and need bidirectional data transmission. Therefore, the two conversion circuits are formed with UART's which are asynchronous data transmission LSI's having both the parallel-serial conversion and the serial-parallel conversion functions.

In the isolation circuits 503, in order to isolate the signal conversion circuits 525 and 515 from each other, one isolation unit is installed for each of input and output start-stop synchronization signal lines connecting the two conversion circuits 525 and 515. As the isolation unit, a photocoupler or an isolation transformer or the like can be used. In an actual system, the isolation units are installed for not only the start-stop synchronization signal lines between the two signal conversion circuits 525 and 515 but also other signal lines such as a video signal line so that isolation between the master circuit 502 and the slave circuit 501 is secured.

Program updating processing in the system 500 will be explained next.

An operator (not shown in FIG. 5) transfers the update operating program from the external apparatus not shown in FIG. 5 to the master processing unit 520 in the master circuit 502 via the connector 505 and an RS-232C line. If a personal computer is used as the external apparatus, the personal computer reads a floppy disc storing the update operating program and a transfer command is then issued by key-input or the like. When a dedicated instrument is used as the external apparatus, the operator installs an update memory loaded with the update operating program in an IC socket while the power of the instrument is OFF, and press a transfer button or the like after the power is turned on.

The master processing unit 520 and the slave processing unit 510 carry out initial processing respectively, and the slave processing unit 510 stands by until an interrupt occurs.

The master processing unit 520 judges whether or not the update operating program is for the slave microcomputer when the update operating program is transferred from the external apparatus. Only in the case where the program has been judged to be for the slave microcomputer, the master processing unit 520 transfers the update operating program to the slave circuit 501. In the case where the update operating program having been transferred from the external apparatus has been judged to be for the master processing unit, the master processing unit 520 shifts to a mode for updating a program of its own.

As a method for this judgment, the master microcomputer and the external apparatus may determine in advance which microcomputer the update operating program to be transferred is for, and program data transferred from the external apparatus are immediately transferred to the slave microcomputer. Alternatively, the operator who makes this judgment may input a key. However, it is preferable for the system to carry out automatic judgment in the following manner.

In other words, the master processing unit 520 requests from the slave processing unit 510 transfer of version information of the current operating program of the slave microcomputer. In response to the request of the master circuit 502, that is, the request of the master processing unit 520, the slave processing unit 510 transfers to the master processing unit 520 the version information of the current operating program stored in the program memory 513, via the signal conversion circuits 515 and 525 and the isolation circuit 503.

The master processing unit 520 obtains version information of the update operating program, and compares the version information having been obtained with the version information of the current operating program transferred from the slave circuit 501, that is, from the slave processing unit 510. When the update operating program is newer than the current operating program, the update operating program is judged to have been transferred for the slave microcomputer. In order to obtain the version information of the update operating program, the version information is described in the update operating program and the master processing unit 520 reads this version information. Upon comparison of the version information, an identification name of each operating program or a time stamp is used.

The pre-transmission processing is carried out in this manner, and the program updating processing which will be described later is carried out only in the case where the update operating program transferred from the external apparatus is for the slave microcomputer and newer than the current operating program. In this manner, an update operating program which cannot be rewritten by the slave microcomputer is not transmitted to the slave microcomputer.

Furthermore, rewriting of the operating program of the slave microcomputer with the update operating program for the master microcomputer or with an old-version operating program is prevented. If automatic processing is carried out in the above manner, the operator's labor is saved.

In the case where the update operating program is for the slave microcomputer, it is possible for the master microcomputer to immediately transfer the update operating program to the slave microcomputer without judging its version to cause the slave microcomputer to judge the version, although this is not efficient.

In a system where the apparatus comprising the master circuit 502 is connected to a separate apparatus comprising the slave circuit 501 by a cable or the like, it is preferable for the system to comprise means for confirming connection between the circuits 502 and 501 so that processing in accordance with a state of connection can be carried out. In other words, the pre-transmission processing described above and the program update processing which will be described later are carried out only in the case where the two circuits are connected to each other, and processing is suspended without execution of the pre-transmission processing or the like when the two circuits are not connected to each other.

The master processing unit 520 shifts to the processing for updating the operating program of the slave microcomputer in the case where the update operating program has been judged to be for the slave microcomputer in the pre-transmission processing. In other words, the master processing unit 520 judges whether or not the program-rewriting program has been transferred from the external apparatus, and transfers the program-rewriting program to the slave circuit 501 via the signal conversion circuits 515 and 525 and the isolation circuit 503 in the case where the program-rewriting program has been transferred. The slave processing unit 510 writes the program-rewriting program having been transferred from the master circuit 502 in the expansion memory 512, and updates the operating program thereof by using the program-rewriting program in a manner which will be described later.

In the case where the program-rewriting program is not transferred from the master circuit 502, the slave processing unit 510 writes in the expansion memory 512 a program-rewriting program stored in the program memory 513, and updates the operating program.

As has been described above, if not only the update operating program but also the program-rewriting program are transferred, processing in accordance with the form of the update operating program can be carried out. For example, when the update operating program is transferred from the external apparatus as compressed data, a decompression program corresponding to the compression algorithm is transferred to decompress the update operating program. Therefore, any compression algorithm can be used. Furthermore, if the program-rewriting program is necessarily transferred from the external apparatus, only portions for general processing in the slave circuit 501 (a true operating program) and for writing the program-rewriting program in the expansion memory 512 are stored in the program memory 513 as the operating program. As a result, unnecessary program portions not normally used, such as for receiving the update operating program or for writing the update operating program in the program memory 513, are not stored in the program memory 513, which leads to efficient use of the memory 513.

After writing of the program-rewriting program by the slave circuit 501 is completed, the master processing unit 520 obtains the update operating program from the external apparatus and transfers the update operating program having been obtained to the slave circuit 501 via the signal conversion circuits 525 and 515 and the isolation circuit 503. The slave processing unit 510 updates the current operating program with the update operating program by writing in the program memory 513 the update operating program having been transferred thereto from the master circuit 502. If the size of the update operating program is larger then a rewrite unit of the program memory 513, program data acquisition from the external apparatus, program data transfer and writing and are carried out several times by dividing the update operating program by the rewrite unit.

As has been described above, the master circuit 502 obtains the update operating program for the slave microcomputer from the external apparatus, and transfers the update operating program having been obtained to the slave circuit 501. The transferred program is written in the program memory 513. In this manner, update of the operating program can be carried out easily for the slave microcomputer located in the slave circuit 501. Furthermore, since the update operating program is obtained from the external apparatus via the RS-232C line, no ROM exchange or management is necessary. The enclosure is not opened, which leads to an easier update operation. The power is not turned on or off during the update operation, which is also convenient.

Moreover, by automatically judging through version comparison which program needs to be updated or which operating program is new or old, unnecessary program transfer and erroneous update (rewriting) of the operating program are avoided.

As has been described above, according to the multi-microcomputer system of the present invention, the operating programs for a plurality of the microcomputers can be updated with certainty by simply and easily obtaining the update operating program from the external apparatus, and function extensibility and convenience of the system can be improved.

If the interface between the two microcomputers is realized by using parallel signals, many control lines are necessary, and the number of isolation units is increased in proportion. However, according to the system of the present invention, signal connection (bidirectional communication) between the master processing unit 520 and the slave processing unit 510 is realized by using the start-stop synchronization signal which is a serial signal, not by using parallel signals. Therefore, the number of the signal lines between the both processing units 520 and 510 is extremely small, which leads to a substantial reduction in the number of isolation units for isolating the master circuit 502 from the slave circuit 501. Furthermore, since UART's, which are general LSI's for conversion, are used for converting the parallel signals into the serial signal, the signal conversion circuits 525 and 515 become simple. Moreover, since the start-stop synchronization signals are used, a switching circuit for switching directions of a clock signal and isolation units for the clock signal are not necessary compared with the case of clock synchronization communication which is also a serial communication method. Therefore, the isolation circuit 503 becomes simple.

Upon connecting the external apparatus with the apparatus adopting this system, the master circuit 502 which is electrically isolated from the slave circuit 501 connects the external apparatus thereto and the master microcomputer therein carries out direct control of the external apparatus. Furthermore, communication between the master and the slave microcomputers is carried out according to the start-stop synchronization method. Therefore, the both microcomputers can be connected by the two signal lines, regardless of a communication protocol adopted by the external apparatus being serial or parallel, or regardless of a difference in communication protocols between external apparatuses. As a result, the system having flexible extensibility for dealing with various forms of communication protocol adopted by the external apparatus can be provided without increasing the number of isolation units such as photocouplers.

Figure 6:
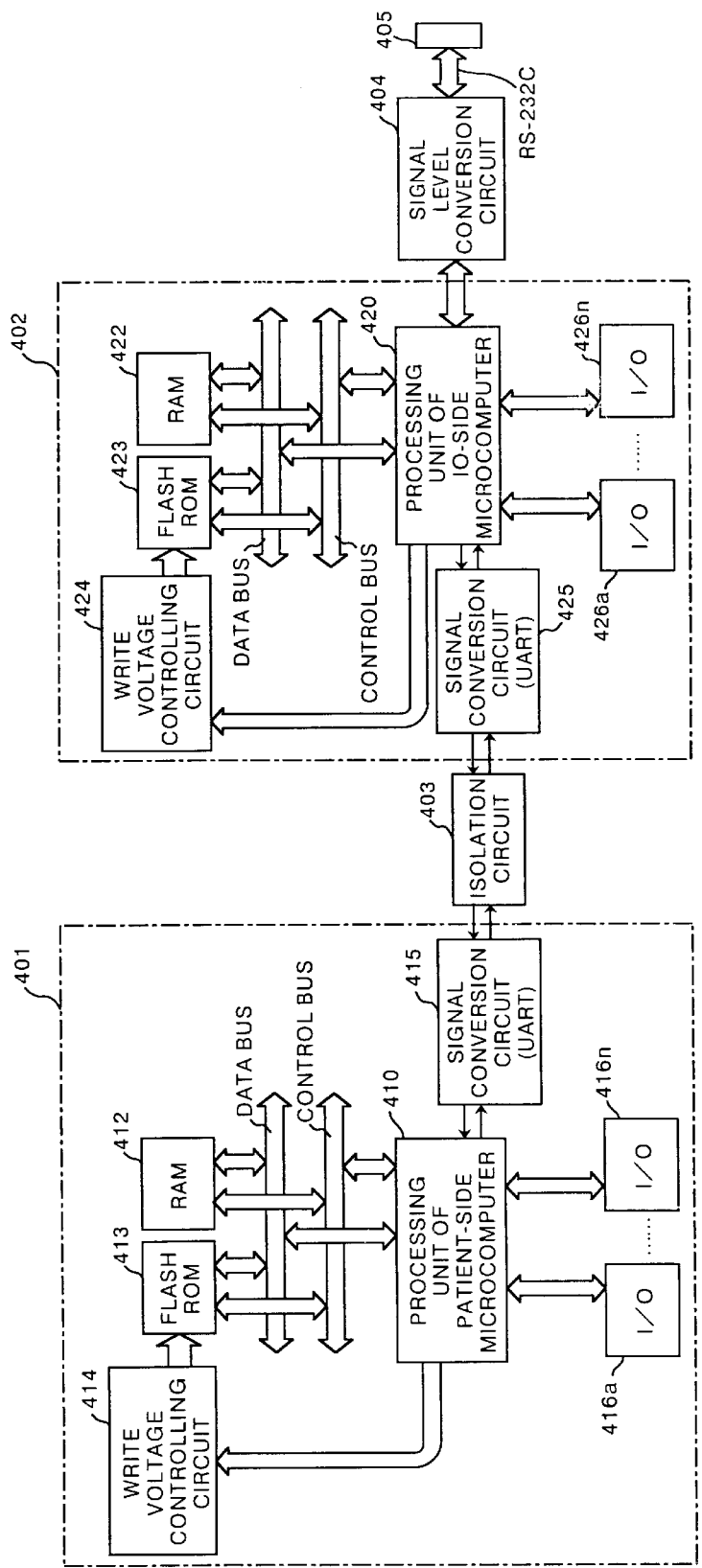
FIG. 6 is a block diagram showing a configuration of an endoscope adopting the multi-microcomputer system shown in FIG. 5.
Figure 7:
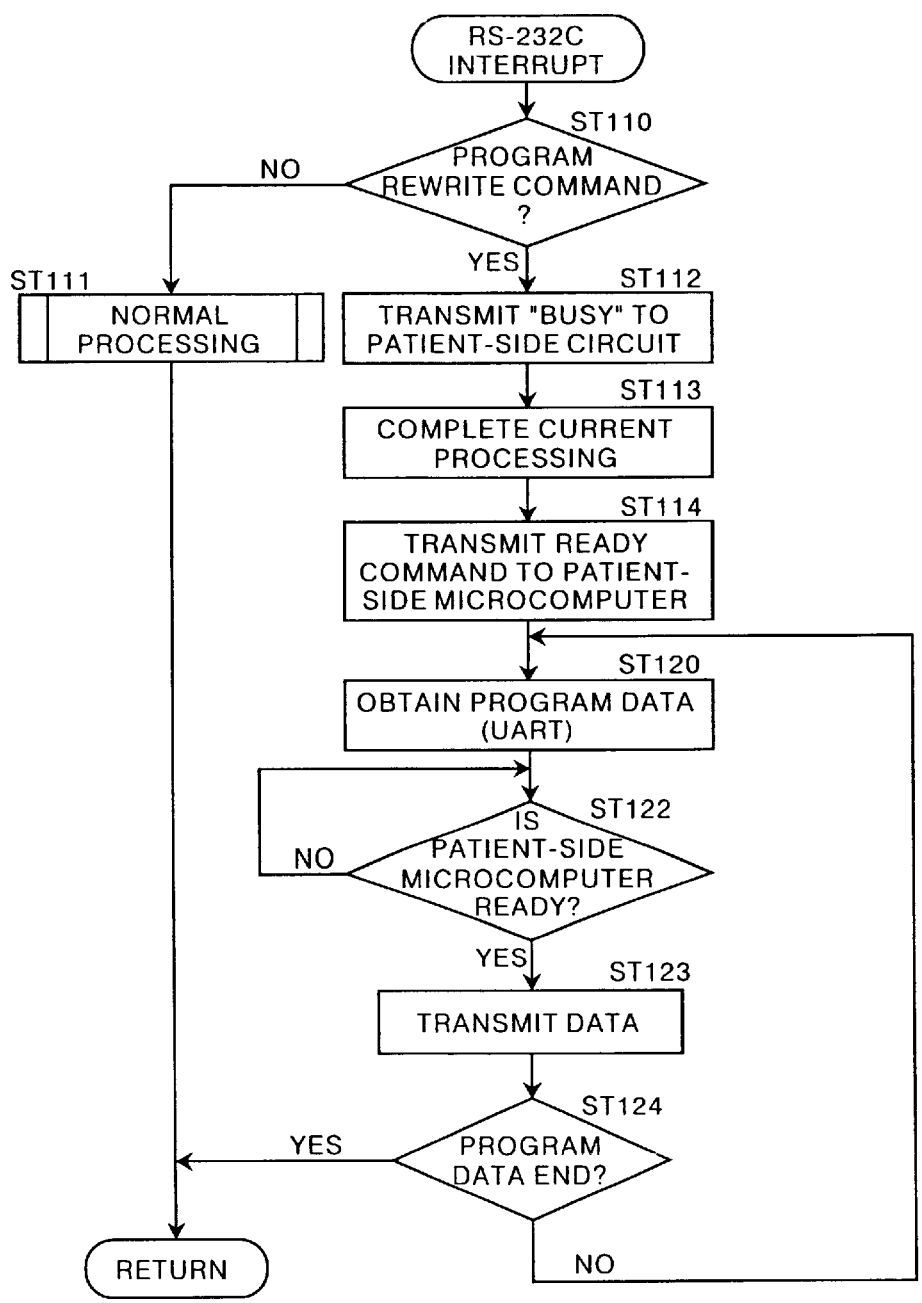
FIG. 7 is a flow chart showing program updating processing by an IO-side circuit in the case of the endoscope adopting the multi-microcomputer system shown in FIG. 5.
Figure 8:
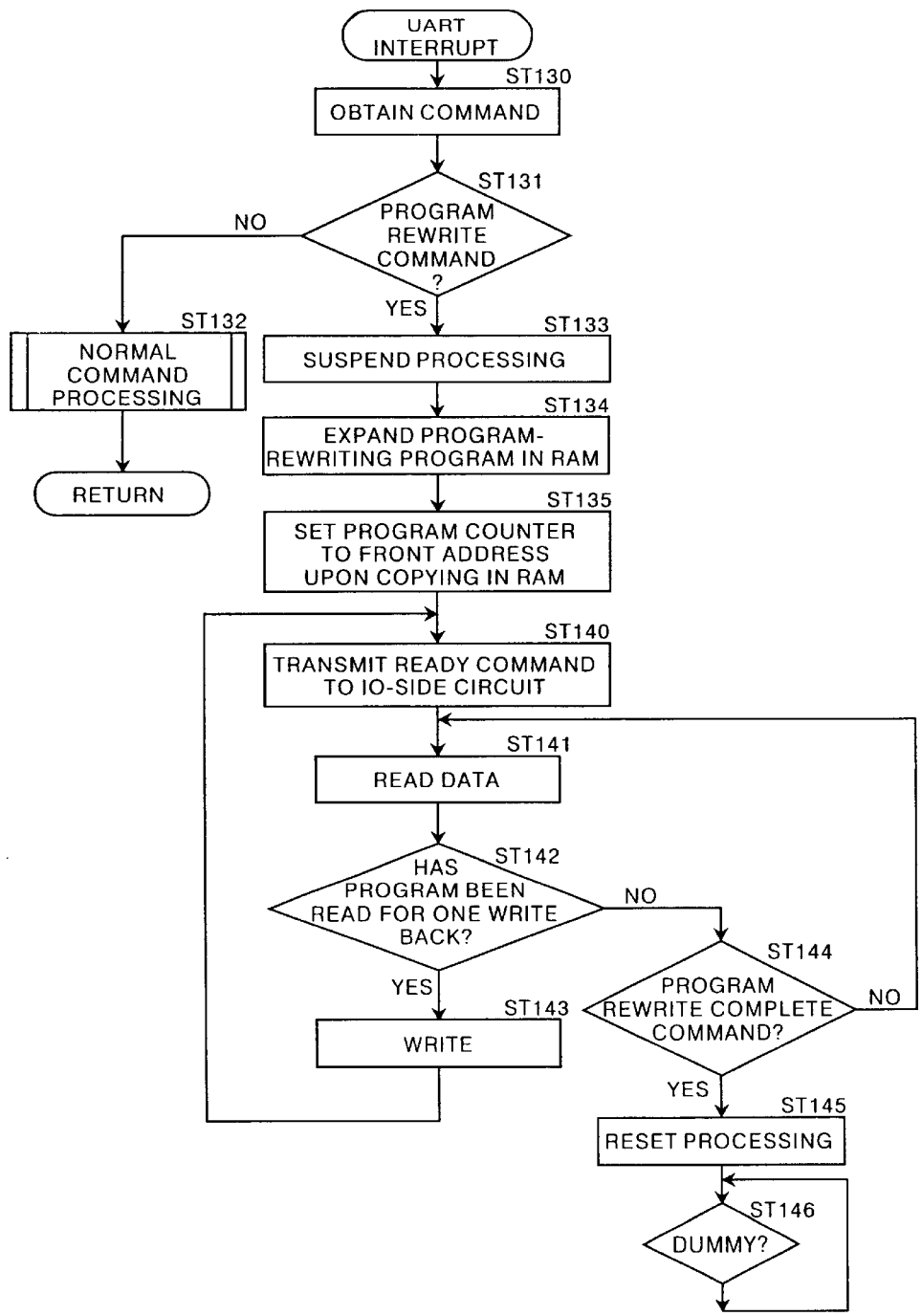
FIG. 8 is a flow chart showing program updating processing a patient-side circuit in the case of the endoscope adopting the multi-microcomputer system shown in FIG. 5.

A method of updating an operating program used in an electronic endoscope adopting the present invention shown in FIG. 5 will be explained with reference to FIGS. 6 to 8. FIG. 6 is a block diagram showing a portion of microcomputer circuits related to program updating in the electronic endoscope. FIG. 7 is a flow chart showing program updating processing in an IO-side circuit in the endoscope, and FIG. 8 is a flow chart for the same processing in a patient-side circuit therein.

As shown in FIG. 6, the microcomputer circuit of the endoscope roughly comprises a patient-side circuit 401 corresponding to the slave circuit, an IO-side circuit 402 corresponding to the master circuit, an isolation circuit 403, and a signal level conversion circuit 404 connected to the IO-side circuit 402. The patient-side circuit 401 and the IO circuit 402 are connected to each other via the isolation circuit 403.

The patient-side circuit 401 is a circuit in a scope unit of the endoscope which has imaging means such as a CCD imaging element at the end thereof. The patient-side circuit 401 comprises a processing unit 410 of a patient-side microcomputer (hereinafter called a patient-side processing unit) corresponding to the slave processing unit, a RAM 412 corresponding to the expansion memory for the slave microcomputer, a flash ROM 413 storing an operating program for the patient-side microcomputer and corresponding to the program memory for the slave microcomputer, a write voltage controlling circuit 414, a signal conversion circuit 415 comprising a UART and for outputting to the IO-side circuit 402 parallel data (including control data) input from the patient-side processing unit 410, after converting the data into a start-stop synchronization signal, and for outputting to the patient-side processing unit 410 a start-stop synchronization signal input from the IO-side circuit 402 after converting the signal into parallel data (including control data), and I/O'S 416a~416n as interface units for peripheral circuits.

The IO-side circuit 402 is a circuit for interface with an apparatus connected externally to the endoscope. The IO-side circuit 402 comprises a processing unit 420 of an IO-side microcomputer (hereinafter called an IO-side processing unit) corresponding to the master processing unit, a RAM 422 corresponding to the expansion memory for the master microcomputer, a flash ROM 423 storing an operating program for the IO-side microcomputer and corresponding to the program memory for the master microcomputer, a write voltage controlling circuit 424, a signal conversion circuit 425 comprising aUART and for outputting to the patient-side circuit 401 parallel data (including control data) input from the IO-side processing unit 420 after converting the data into a start-stop synchronization signal and for outputting to the IO-side processing unit 420 a start-stop synchronization signal input from the patient-side circuit 401 after converting the signal into parallel data (including control data), and I/O'S 426a-426n as interface units for peripheral circuits.

In the isolation circuit 403, one isolation unit is used for each of start-stop synchronization signal lines of input and output connecting the two signal conversion circuits 415 and 425, in order to isolate the two conversion circuits from each other.

The signal level conversion circuit 404 is connected to the IO-side circuit 402, for outputting a signal from the IO-side circuit 402 to an external apparatus which is not shown in FIG. 6 after converting the signal into a signal of a voltage level of the external apparatus and for outputting to the IO-side circuit 402 a signal input from the external apparatus after converting the signal into a signal of a voltage level of the IO-side circuit 402. The signal level conversion circuit is connected to the external apparatus via a connector 405. In this embodiment, the IO-side circuit 402 interfaces with the external apparatus according to a signal format based on the RS-232C standard. A personal computer is used as the external apparatus involved in program rewriting.

Processing for updating an operating program for the endoscope will be explained with reference to the flow charts in FIGS. 7 and 8.

When an interrupt occurs from the personal computer which is the external apparatus to the IO-side processing unit 420 via the signal level conversion circuit 404, the IO-side processing unit 420 judges whether or not the interrupt is a program rewrite command (ST110). In the case where the interrupt is not the rewrite command, the IO-side processing unit returns to normal processing (ST111).

Meanwhile, when the interrupt has been judged to be the program rewrite command, the IO-side processing unit 420 transmits aBUSY command to the patient-side circuit 401 (ST112). The IO-side processing unit 420 completes on-going processing and carries out predetermined preparation for program rewriting processing (ST113). In other words, the IO-side processing unit 420 obtains version information of the update operating program transferred from the external apparatus, as the preparation for program rewriting. The version information includes information indicating whether the update operating program is for the patient-side circuit 401 or for the IO-side circuit 402. For example, the version information includes an ID for judgment and an identification name of the update operating program, or the judgment ID and a time stamp of the program. The information may have an ID code indicating a serial number, the judgment ID, the identification name, the time stamp and the like.

The IO-side processing unit 420 judges whether the update operating program is for the patient-side circuit 401 or for the IO-side circuit 402, based on the version information having been obtained. If the program is for itself, the IO-side processing unit 420 shifts to processing for rewriting its own operating program.

Meanwhile, if the update operating program is for the patient-side circuit 401, the IO-side processing unit 420 interrupts the patient-side processing unit 410 and requests transfer of version information of the patient-side microcomputer from the patient-side processing unit 410. In other words, the IO-side processing unit 420 requests transfer of the identification name or the time stamp indicating the version information of the current operating program in the flash ROM 413, and obtains the version information requested.

The IO-side processing unit 420 compares the identification names or the time stamps between the version information of the flash ROM 413 transferred from the patient-side circuit 401 and the version information of the update operating program having been obtained. The IO-side processing unit 420 judges whether or not the current operating program needs to be replaced with the update operating program, that is, whether or not the version of the update operating program is newer than that of the current operating program in the flash ROM 13. In the case where the version of the update operating program has been judged to be not newer than the current program in the flash ROM 413 and not in need of updating, no updating processing is necessary. Therefore, the IO-side processing unit 420 returns to normal processing. Meanwhile, in the case where the version of the update operating program has been judged to be newer than the version of the current program and in need of updating, the IO-side processing unit 420 transmits a program rewrite command to the patient-side circuit 401 (ST114). At this time, if the program-rewriting program can be obtained from the external apparatus, the program is obtained from the external apparatus via the signal level conversion circuit 404 and transferred to the patient-side circuit 401 via the signal conversion circuit 425, the isolation circuit 403, and the signal conversion circuit 415 in this order.

The IO-side processing unit 420 continues acquisition of the update operating program from the external apparatus via the signal level conversion circuit 404 (ST120). After a predetermined amount of program data have been obtained, the IO-side processing unit 420 stands by until the patient-side circuit 401 is ready, that is, until a ready command is transmitted from the patient-side circuit 401 (ST122-NO). Meanwhile, when an interrupt occurs from the IO-side circuit 402 via the signal conversion circuits 415 and 425 (ST130), the patient-side processing unit 410 judges whether or not the interrupt is a program rewrite command (ST131). When the interrupt is not the program rewrite command, the patient-side processing unit 410 returns to normal processing (ST132).

On the other hand, when the program rewrite command is transmitted from the IO-side circuit 402 at ST131, the patient-side processing unit 410 judges the interrupt to be the program rewrite command, and suspends on-going processing (ST133). The patient-side processing unit 410 writes (expands) in the RAM 412 the program-rewriting program having been transferred from the IO-side circuit 402 and carries out update processing by using the program-rewriting program in the manner which will be explained later (ST134). When the program-rewriting program is not transferred from the IO-side circuit 402, the patient-side processing unit 410 writes in the RAM 412 a program-rewriting program stored in the flash ROM 413 and carries out the update processing by using the program.

The patient-side processing unit 410 sets a program counter to a front address upon expansion in the RAM 412 (ST135), and transmits the ready command to the IO-side circuit 402 (ST140).

Having received the ready command from the patient-side processing unit 410, the IO-side processing unit 420 transmits the data of the update operating program obtained from the external apparatus (ST123). Meanwhile, the patient-side processing unit 410 carries out reading processing until the predetermined amount of the update operating program have been obtained (ST141, 142, 144).

After the predetermined amount data of the update operating program have been read, the current operating program is updated with the program data having been read. In other words, the patient-side processing unit 410 transmits a BUSY command to the IO-side circuit 402 and starts writing the program data in the flash ROM 413 (ST143). The data are written in the flash ROM 413 by controlling the write voltage controlling circuit 414.

The flash ROM 413 has a predetermined rewrite unit (such as 256 bytes) as one block. When the rewrite unit is accessed, other blocks within the same chip are generally inaccessible. Based on this fact, program transfer from the external apparatus to the IO-side circuit 402 and from the IO-side circuit 402 to the patient-side circuit 401 is carried out according to the rewrite unit of the flash ROM 413. Therefore, when the size of the update operating program transferred from the external apparatus is larger than the rewrite unit, acquisition, transfer and writing of the program is carried out a plurality of times by dividing the program by the rewrite unit.

More specifically, the IO-side processing unit 420 judges whether all the program data have been read from the external apparatus by presence of an end code in the program data (ST124). In the case where the end code has been judged to exist, the IO-side processing unit 420 finishes the processing and transmits a program rewrite complete command to the patient-side processing unit 410 (ST124-YES). On the other hand, in the case where the end code has been judged to be absent, data reading and transfer are continued (ST124-NO).

The patient-side processing unit 410 judges whether or not all the program data have been obtained by using the program rewrite complete command to be transmitted from the IO-side processing unit 420 (ST144). In the case where the command has not been transferred, the steps ST140~143 are repeated after completion of each data writing operation in the flash ROM 413 (ST143). In the case where the program rewrite complete command has been transferred from the IO-side processing unit 420, the patient-side processing unit 410 carries out reset processing (ST145, 146). The reset processing is carried out as a hardware reset where a reset signal is fed to a reset circuit comprising the microcomputer-circuit and not shown in FIG. 6. In this manner, the system starts an operation based on the operating program having been updated.

After completion of rewriting the data in the flash ROM 413, the RAM 412 still has the rewriting program. Therefore, by setting the rewriting program to a front address of the flash ROM 413 and causing the program to run again, the reset processing may be carried out. However, this method is more complex than the hardware reset described above.

The preferred embodiments of the multi-microcomputer system of the present invention have been described above. However, the present invention is not limited to the above embodiments and various modifications can be made thereto within the scope of the present invention.

For example, in the embodiment where the present invention is applied to the endoscope, the update operating program transferred from the IO-side circuit 402 is written in the flash ROM 413 in the patient-side circuit 401 in order to update the operating program of the patient-side microcomputer. However, regarding the update of the operating program, the opposite embodiment is also possible. In other words, the IO-side circuit 402 is used as the slave circuit and the patient-side circuit 401 is used as the master circuit. An update operating program for the IO-side microcomputer is transferred from the external apparatus to the patient-side circuit 401. By further transferring to the IO-side circuit 402 the update operating program having been transferred and writing the program in the flash ROM 423, the operating program for the IO-side microcomputer can be updated. In this case, an isolation circuit separate from the isolation circuit 403 is necessary for isolating the patient-side circuit 401 from the external apparatus. Therefore, in order to configure the apparatus simply, the embodiment described above (FIG. 6) is preferable.

The multi-microcomputer systems of the present invention are applicable not only to the electronic endoscope but also to various kinds of electronic apparatuses, namely electronic medical apparatuses such as electro-cardiographs and domestic appliances such as TV sets and VCR's, for example. The number of slave microcomputers may not necessarily be limited to one and a plurality of the slave microcomputers may exist. For each of the slave microcomputers, an update operating program therefor may be obtained from the external apparatus and transferred from the master microcomputer to the slave microcomputer. By writing the update operating program having been transferred in a program memory for the microcomputer, the operating program of the slave microcomputer can be updated individually.

What is claimed is:

1. A multi-microcomputer system comprising a master microcomputer and a slave microcomputer, the multi-microcomputer system comprising:

in a master circuit having the master microcomputer therein, a socket for installing an update memory loaded with an update operating program, the master microcomputer comprising:
a master processing unit for judging whether or not the update operating program for the slave microcomputer is stored in the update memory when the update memory is installed in the socket and for transferring the update operating program to a slave circuit having the slave microcomputer therein in the case where the memory has been judged to store the update operating program, the slave microcomputer comprising:
a program memory for storing a current operating program; and
a slave processing unit for updating the current operating program with the update operating program when the update operating program is transferred.

2. A multi-microcomputer system as claimed in claim 1, wherein the slave processing unit transfers version information of the current operating program to the master processing unit and
the master processing unit reads version information of the update operating program from the update memory and judges whether the update operating program for the slave microcomputer is stored in the update memory by comparing the version information of the update operating program having been read with the version information of the current operating program having been transferred.

3. A multi-microcomputer system as claimed in claim 1 or 2, the update memory storing a program-rewriting program, the master processing unit reading the program-rewriting program from the update memory when the update memory is installed in the socket and transferring the program-rewriting program to the slave circuit, the slave microcomputer comprising an expansion memory for storing the program-rewriting program, and the master processing unit writing in the expansion memory the program-rewriting program having been transferred and updating the current operating program with the update operating program by using the program-rewriting program having been written in the expansion memory.

4. A multi-microcomputer system as claimed in any one of claims 1 to 3, further comprising:

a first signal conversion circuit for outputting parallel data input from the master processing unit to the slave circuit after converting the data into a start-stop synchronization signal and for outputting a start-stop synchronization signal input from the slave circuit to the master processing unit after converting the signal from the slave circuit into parallel data; and a second signal conversion circuit for outputting parallel data input from the slave processing unit to the master circuit after converting the data into a start-stop synchronization signal and for outputting a start-stop synchronization signal input from the master circuit to the slave processing unit after converting the signal from the master circuit into parallel data.

5. A multi-microcomputer system as claimed in claim 4, wherein the first and the second signal conversion units are formed with asynchronous data transfer LSI's having functions of parallel-serial conversion and serial-parallel conversion.

6. A multi-microcomputer system as claimed in claim 4 or 5, further comprising isolation means for electrically isolating the first signal conversion circuit from the second signal conversion circuit.

7. A multi-microcomputer system comprising a master microcomputer and a slave computer, the multi-microcomputer system comprising:

a first signal conversion circuit for outputting parallel data input from the master microcomputer to the slave microcomputer after converting the data into a start-stop synchronization signal and for outputting a start-stop synchronization signal input from the slave microcomputer to the master microcomputer after converting the signal from the slave microcomputer into parallel data;

a second signal conversion circuit for outputting parallel data input from the slave microcomputer to the master microcomputer after converting the data into a start-stop synchronization signal and for outputting a start-stop synchronization signal input from the master microcomputer to the slave microcomputer after converting the signal from the master microcomputer into parallel data; and isolation means for electrically isolating the first signal conversion circuit from the second signal conversion circuit.

8. A multi-microcomputer system as claimed in claim 7, wherein the first signal conversion circuit and the second signal conversion circuit comprise asynchronous data transfer LSI's having functions of parallel-serial conversion and serial-parallel conversion.

9. A multi-microcomputer system as claimed in any one of claims 6 to 8, wherein the master microcomputer is located in a scope-side circuit of an electronic endoscope having imaging means at the end thereof and the slave microcomputer is located in a circuit in the endoscope for interface with an apparatus externally connected to the endoscope.

10. A multi-microcomputer system comprising a master microcomputer and a slave microcomputer, the system comprising:

a signal level conversion circuit for outputting a signal output from a master circuit having the master microcomputer therein to an external apparatus after converting the signal into a signal of voltage level of the external apparatus and for outputting a signal input from the external apparatus to the master circuit after converting the signal from the external apparatus into a signal of a voltage level of the master circuit, the master microcomputer comprising:

a master processing unit for judging whether or not an update operating program is for the slave microcomputer when the program is transferred from the external apparatus via the signal level conversion circuit, and for transferring the update operating program to a slave circuit having the slave microcomputer therein in the case where the program has been judged to be for the slave microcomputer, and the slave microcomputer comprising:

a program memory storing a current operating program, and a slave processing unit for updating the current operating program with the update operating program when the update operating program is transferred.

11. A multi-microcomputer system as claimed in claim 10, wherein the slave processing unit transfers version information of the current operating program of the slave microcomputer to the master processing unit, and the master processing unit obtains version information of the update operating program and judges whether or not the update operating program is for the slave microcomputer by comparing the version information of the update operating program having been obtained with the version information of the current operating program having been transferred.

12. A multi-microcomputer system as claimed in claim 10 or 11, the master processing unit transferring a program-rewriting program to the slave circuit when the program-rewriting program is transferred via the signal level conversion circuit, the slave microcomputer comprising an expansion memory for storing the program-rewriting program, and the master processing unit writing in the expansion memory the program-rewriting program having been transferred and updating the current operating program with the update operating program by using the program-rewriting program having been written in the expansion memory.

13. A multi-microcomputer system as claimed in any one of claims 10 to 12, wherein the signal level conversion circuit carries out signal level conversion according to RS-232C standard.

14. A multi-microcomputer system as claimed in any one of claims 10 to 13, further comprising:

a first signal conversion circuit for outputting parallel data input from the master processing unit to the slave circuit after converting the data into a start-stop synchronization signal and for outputting a start-stop synchronization signal input from the slave circuit to the master processing unit after converting the signal from the slave circuit into parallel data; and a second signal conversion circuit for outputting parallel data input from the slave processing unit to the master circuit after converting the data into a start-stop synchronization signal and for outputting a start-stop synchronization signal input from the master circuit to the slave processing unit after converting the signal from the master circuit into parallel data.

15. A multi-microcomputer system as claimed in claim 14, wherein the first signal conversion circuit and the second signal conversion circuit are formed with asynchronous data transfer LSI's having functions of parallel-serial conversion and serial-parallel conversion.

16. A multi-microcomputer system as claimed in any one of claims 10 to 15, further comprising isolation means for electrically isolating the master circuit from the slave circuit.

17. A multi-microcomputer system as claimed in claim 16, wherein the slave circuit is a scope-side circuit of an electronic endoscope having imaging means at the end thereof and the master circuit is a circuit in the endoscope for interface with an apparatus externally connected to the endoscope.

* * * * *